United States Patent [19]

Chen et al.

[11] Patent Number: 4,977,591

[45] Date of Patent: Dec. 11, 1990

[54] DUAL MODE LMS NONLINEAR DATA ECHO CANCELLER

[75] Inventors: Walter Y. Chen, Brookside, N.J.; Richard A. Haddad, Tuxedo, N.Y.

[73] Assignee: NYNEX Corporation, New York, N.Y.

[21] Appl. No.: 438,598

[22] Filed: Nov. 17, 1989

[51] Int. Cl.⁵ ............................................. H04M 1/00
[52] U.S. Cl. .................................. 379/410; 370/32.1
[58] Field of Search ..................... 379/406, 410, 411; 370/32, 32.1

[56] References Cited

U.S. PATENT DOCUMENTS 4,064,379  12/1977  Horna ................................ 379/411
4,669,116   5/1987  Agazzi et al. ....................... 370/32

OTHER PUBLICATIONS

E. J. Thomas, "Some Considerations on the Application of the Volterra Representation of Nonlinear Networks to Adaptive Echo Cancellers", B.S.T.J. vol. 50, No. 8, pp. 2797-2805, Oct. 1971.
N. H. Holte and S. Stueflotten, "A New Digital Echo Cancelle- for Two-Wire".
"Subscriber Lines", IEEE Trans. Commun., vol. COM-29, No. 11, pp. 1573-1580.
O. Agazzi, D. G. Messerschmitt, and D. A. Hodges, "Nonlinear Echo Cancellation of Data Signals", IEEE Trans. Commun., vol. COM-30, pp. 2421-2433, Nov. 1982.

Primary Examiner—Jin F. Ng
Assistant Examiner—Jhancy Augustus
Attorney, Agent, or Firm—Loren Swingle and Kenneth Rubenstein

[57] ABSTRACT

An adaptive nonlinear data driven echo canceller is disclosed. Unlike other approaches to nonlinear echo cancellation, the inventive echo canceller treats the nonlinearity of the echo path as nonlinear noise associated with transmitting data symbols through a linear echo path. In comparison to a conventional LMS data driven linear echo canceller, the inventive echo canceller utilizes only an additional small random access memory for storing a nonlinear function for estimating the effect of the nonlinear echo path on transmitted data symbols. The same LMS algorithm is used to estimate the linear echo path and the nonlinear function. The signal processing power of a conventional linear data driven LMS echo canceller is sufficient to implement the inventive nonlinear echo canceller and the convergence speed of the nonlinear echo canceller can be less than three times that of the conventional linear LMS echo canceller.

14 Claims, 4 Drawing Sheets

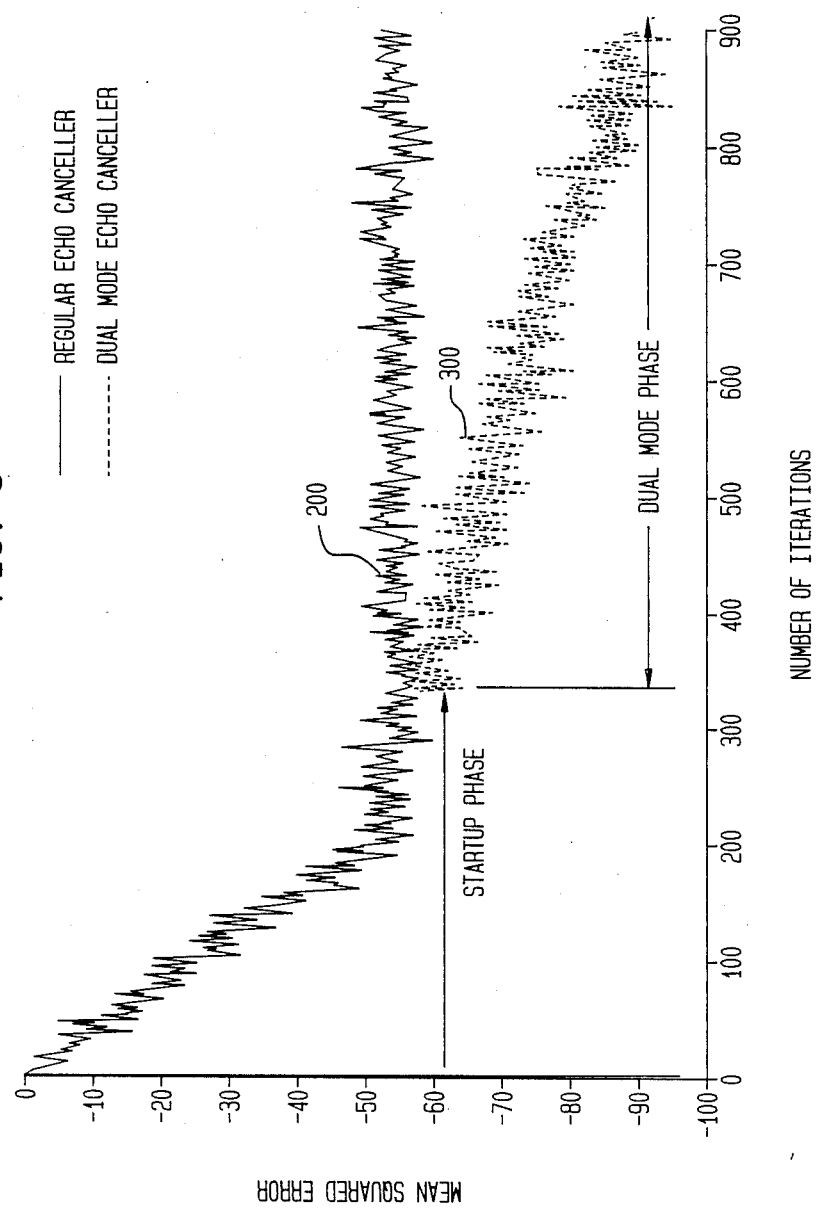

DUAL MODE LMS NONLINEAR DATA ECHO CANCELLER

RELATED APPLICATIONS

The following applications contain subject matter related to the subject matter of the present application.

1. "Dual Mode LMS Channel Equalizer" filed on even data herewith for Walter Y. Chen and Richard A. Haddad and bearing Ser. No. 07/438,733; and 2. "Speech Enhancement Filtering" filed on even date herewith for Walter Y. Chen and Richard A. Haddad and bearing Ser. No. 07/438,610.

The above-identified related applications are assigned to the assignee hereof.

FIELD OF THE INVENTION

The present invention relates to an echo canceller for enabling full duplex data transmission over a two-wire telephone voice channel.

BACKGROUND OF THE INVENTION

The regular telephone voice channel has been used for digital data transmission since the early 1960's. The digital data to be transmitted is modulated onto a sine wave carrier signal whose frequency is within the voice transmission band. The digital data is demodulated off the carrier signal after transmission via the telephone channel. The device used at the transmitting end to modulate the data onto the carrier is known as a modem. A modem is also used at the receiving end to demodulate the data from the carrier. Three basic modulation techniques used for the transmission of digital data over the telephone voice channel are Amplitude Modulation, Frequency Shift Keying, and Phase Shift Keying.

A medium speed full duplex modem usually allocates one-half of the voice transmission band for transmitting and the other half for receiving on a two-wire telephone channel. This is accomplished through use of a frequency division multiplexing technique wherein a transmitting subband and a receiving subband are frequency multiplexed. The highest transmission speed based on such a scheme without using data compression is around 1200 bits per second.

To further increase the transmission rate of a full duplex modem, use of an adaptive echo canceller may be required. An adaptive echo canceller can cancel echoes induced at the local loop of the telephone network due to four-wire to two-wire conversion. The adaptive echo canceller permits the entire voice band can be used for transmitting and receiving at the same time without the use of frequency multiplexing.

More particularly, at the near end of a voice channel used for data transmission, the transmitter and receiver of a modem are each connected by a two-wire pair (i.e. a total of four wires) to a hybrid. The hybrid interfaces the four-wire loop to the two-wire local loop of the telephone network. A strong echo of the transmitted data signal is induced by the four-wire to two-wire conversion performed by the hybrid. The echo arises as a result of an impedance mismatch at the hybrid so that a fraction of a data signal generated by the transmitter is not transferred to the two-wire local loop, but is instead, returned to the receiver. Other, weak echoes may also be introduced at other locations along the voice channel where four-wire to two-wire conversions take place.

Thus, the signal received at a receiver of a modem includes an actual data signal to be received and an echo component. It is the role of the echo canceller to reduce the echo component of the received signal as much as possible so that the actual data signal to be received is reliably detected.

In a conventional adaptive echo canceller, the echo path is approximated by an adaptive digital filter whose impulse response approximates as closely as possible the impulse response of the actual echo path. As the transmitted data is available to the echo canceller, the transmitted data is operated on by the estimated echo path impulse response as provided by the echo canceller filter to obtain an estimated echo signal. The estimated echo signal is then subtracted from the received signal to approximately eliminate the echo component from the received signal. Thus, the echo canceller is driven by the transmitted data. The data driven echo canceller has been developed for the purpose of true full duplex (i.e. no frequency division multiplexing and no time division multiplexing) data transmission over the voice telephone channel.

The algorithm used most often to estimate the echo path impulse response is the Least Mean Square (LMS) algorithm. Based on the error between transmitted training data and a received echo signal, the LMS algorithm iteratively converges to set up filter coefficients for an adaptive digital filter whose impulse response estimates the actual echo path impulse response. The LMS algorithm then continually adjusts the filter coefficients which characterize the estimated echo path impulse response so as to make the error between the actual echo signal and the estimated echo signal as small as possible.

As the requirements for echo reduction increase, the effects of nonlinearities in the echo path come into play. A conventional adaptive echo canceller utilizing an LMS algorithm can only cancel those portions of an echo signal resulting from the linear component of the echo path. Nonlinear echo components cannot be cancelled by the conventional LMS data driven echo canceller.

The effects of nonlinear echo components are most severe for higher bit rate transmissions at many different signal levels as in the ISDN (Integrated Services Digital Network) local subscriber loop.

A variety of approaches for handling nonlinear echo components have been proposed. A general approach for nonlinear echo cancellation was suggested in E. J. Thomas, "Some Considerations on the Application of the volterra Representation of Nonlinear Networks to Adaptive Echo Cancellers," *B.S.T.J.*, Vol. 50, No. 8, pp. 2797–2805, Oct. 1971 where the nonlinear component of the echo signal was characterized by a Volterra integral equation. In particular, a nonlinear echo canceller with many extra sets of taps corresponding to the nonlinear integration terms is disclosed. In N. H. Holte and S. Stueflotten, "A New Digital Echo Canceller for Two-Wire Subscriber Lines," *IEEE Trans. Commun.*, Vol. COM-29, No. 11, pp. 1573–1580, Nov. 1981, a memory compensation based technique for nonlinear echo canceller is proposed. In O. Agazzi, D. G. Messerschmitt, and D. A. Hodges, "Nonlinear Echo Cancellation of Data Signals," *IEEE Trans. Commun.*, Vol. COM-30, pp. 2421–2433, Nov. 1982, a special binary series expansion technique is disclosed, and most recently, in M. J. Smith, C. F. N. Cowan, and P. Adams, "Nonlinear Echo Cancellers Based on Transpose Distributed Arithmetic," *IEEE Trans. Accoust., Speech, Signal Processing*, Vol. ASSP-35, pp. 6–17, Jan. 1988, a combined linear and nonlinear structure is proposed.

However, all of the above-mentioned approaches for eliminating the nonlinear components of an echo require extra computation power in comparison to the conventional linear LMS echo cancellation technique. In addition, the above-mentioned prior art techniques for cancelling the nonlinear component of an echo exhibit slow convergence.

In view of the foregoing, it is an object of the present invention to provide a nonlinear data driven echo canceller which overcomes the problems of the above-identified prior art nonlinear echo cancellers. More particularly, it is an object of the present invention to provide a nonlinear data driven echo canceller which has a simple structure, which requires a relatively small amount of computational power, and which converges relatively rapidly.

SUMMARY OF THE INVENTION

The present invention relates to a nonlinear data driven echo canceller for use in connection with the transmission of data over a voice telephone channel. Unlike other approaches to nonlinear echo cancellation, in accordance with the present invention, the nonlinearity of the echo path is treated as nonlinear noise associated with the transmission of data symbols via a linear echo path.

The operation of the inventive nonlinear echo canceller is as follows. During a startup phase, the operation is the same as a conventional linear LMS echo canceller, i.e. the linear echo path impulse response is estimated iteratively using the LMS algorithm. When the remaining uncancelled echo component reaches a level determined by the echo path nonlinearity, the inventive nonlinear echo canceller switches to operation in a dual mode phase.

In the dual mode phase, the same LMS algorithm is used for both nonlinear function estimation and to estimate the linear impulse response of the echo path. More particularly, during the dual mode phase, the nonlinear echo canceller normally estimates, using the LMS algorithm, a nonlinear function which corresponds to the effect of the nonlinearity of the echo path on a transmitted data symbol, while the estimated linear echo path impulse response is held constant. The nonlinear function is stored in a small random access memory comprising part of the echo canceller. Periodically (e.g. once every 5 iterations), the nonlinear function is held constant and the LMS algorithm is used to update the linear echo path impulse response.

The above-described nonlinear echo canceller is highly advantageous in comparison to prior art nonlinear echo cancelers. The inventive nonlinear echo canceller requires little or no more computation power than a conventional linear LMS echo canceller, but results in substantially improved echo cancellation performance. In addition, the convergence time of the inventive nonlinear echo canceller can be less than three times that of the conventional linear LMS echo canceller.

BRIEF DESCRIPTION OF THE DRAWING

FIG. 6 compares the performance of the conventional echo canceller of FIG. 3 with the inventive nonlinear echo canceller of FIG. 5.

DETAILED DESCRIPTION OF THE INVENTION

The detailed description of the invention is divided into four subsections. Subsection A describes the echo path in a telephone voice channel used for data transmission. Subsection B describes the operation of a conventional linear data driven LMS echo canceller. Subsection C describes the operation of the inventive dual mode nonlinear echo canceller. Subsection D compares the performance of the conventional linear LMS echo canceller with the performance of the inventive dual mode nonlinear echo canceller.

A. Echo Return Path

Figure 1:
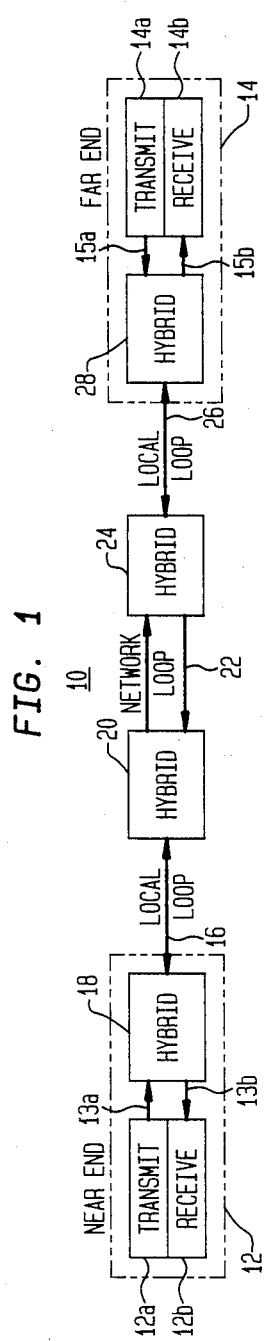
FIG. 1 schematically illustrates the echo path in a telephone voice channel.

FIG. 1 schematically illustrates a telephone voice channel 10 used for the transmission of digital data. The channel 10 has a first modem 12 located at the near end of the channel and a second modem 14 located at the far end of the channel. Each modem comprises a transmitter and a receiver. Thus, the near end modem 12 includes the transmitter 12a for transmitting digital data via the channel 10 to the far end and the receiver 12b for receiving data transmitted from the far end via the channel 10. Similarly, the far end modem 14 includes the transmitter 14a for transmitting digital data to the near end via the channel 10 and the receiver 14b for receiving data from the near end via the channel 10.

In the near end modem 12, a transmitting two-wire pair 13a is connected to the transmitter 12a and a receiving two-wire pair 13b is connected to the receiver 12b. The transmitting two-wire pair 13a and the receiving two-wire pair 13b (i.e. a total of four wires) are converted by the hybrid 18 into a single analog two-wire pair 16. The analog pair 16 forms a local loop of the telephone network and transmits in both directions at the same time.

The hybrid 18 is an electronic bridge. Since the impedance of the analog pair 16 is unknown and time varying, a perfect impedance match for the hybrid is impossible. Due to this hybrid impedance mismatch, a portion of the signal sending through the transmitting two-wire pair 13a comes back from the receiving two-wire pair 13b as an echo. This echo is known as the near-end echo.

In FIG. 1, a hybrid 20 is used to convert the two-wire near end local loop 16 to the four-wire network loop 22. A further hybrid 24 is used to convert the four-wire network loop 22 to the analog two-wire far end local loop 26. This latter four-wire to two-wire conversion gives rise to an additional echo which is received at the near end. This additional echo is known as the far-end echo and is weaker than the near end echo mentioned above.

In the far end modem 14, a far end two-wire transmitting pair 15a is connected to the transmitter 14a and a far end two-wire receiving pair 15b is connected to the receiver 14b. A hybrid 28 converts between the analog two-wire far-end local loop 26 and the far end two-wire transmitting pair 15a and the far end two-wire receiving pair 15b. The impedance mismatches resulting from the four-wire to two-wire conversions at the hybrids 28 and 20 give rise to echoes received at the far end modem 14.

To eliminate the echoes, each modem 12, 14 utilizes an echo canceller. The echo level should be reduced by the echo canceller sufficiently so that the data signal to be received by the modem can be recovered from the combined received signal which includes the data signal to be received and the echo signal. A modem, such as the modem 12 of FIG. 1, which includes an adaptive data driven echo canceller is shown in greater detail in FIG. 2. It should be noted that although the near end modem 12 is illustrated in FIG. 2, the far end modem 14 may have an identical construction.

Figure 2:
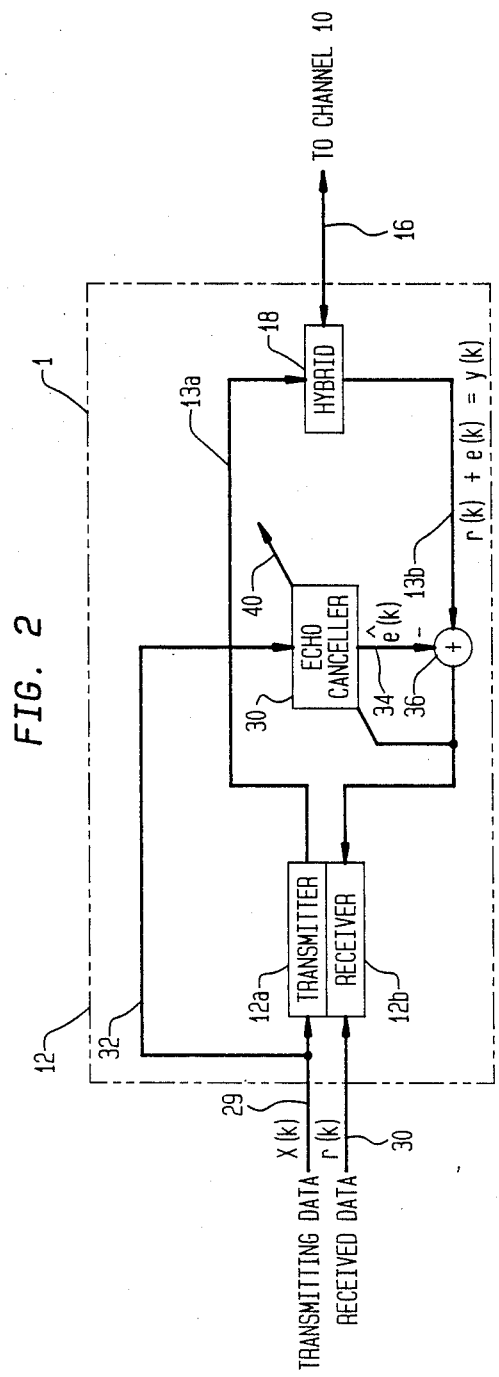
FIG. 2 schematically illustrates a modem which includes a data driven echo canceller.

In FIG. 2, the signal to be transmitted by the near end modem 12 to the far end modem 14 is designated X(k) where k is a discrete time variable. The signal X(k) arrives via line 29 and is encoded by the transmitter 12a onto a sine wave carrier signal whose frequency is within the transmission band of the voice channel 10 (see FIG. 1). The carrier modulated with the signal X(k) is transmitted via the transmitting two-wire pair 13a, the hybrid 18, the analog two-wire pair 16, and via the remainder of the channel 10 (see FIG. 1) to the far end modem 14.

In FIG. 2, the receiving two-wire pair 13b transmits the combined signal Y(k)=r(k)+e(k). The signal r(k) is the digital data signal transmitted from the far end 14 (see FIG. 1) via the channel 10 for reception at the near end modem 12. The signal e(k) is an echo signal whose principal component arises because of the impedance mismatch at the hybrid 18 between the two two-wire pairs 13a, 13b and the single analog two-wire pair 16. Because of the impedance mismatch, a fraction of the sending signal X(k) on the two-wire pair 13a is transmitted by the hybrid to the receiving two-wire pair 13b rather than to the network loop two-wire pair 16 Other components of the echo signal e(k) are generated at other four-wire to two-wire conversion points along the channel.

The purpose of the echo canceller 30 is to cancel as much as possible of the echo signal e(k) so that the received data signal r(k) can be recovered from the combined signal y(k). The echo canceler 30 is data driven. This means that the echo canceller receives as its input via the line 32 the signal X(k). The echo canceller 30 produces as its output on line 34 an estimated signal ê(k) of the actual echo signal e(k). The subtraction unit 36 subtracts ê(k) from y(k) to obtain an approximation of the signal r(k) which is transmitted to the receiver 12b. At the receiver 12b, the signal r(k) is demodulated from a sinusoidal carrier for further transmission via the line 38.

Illustratively, the echo canceller 30 is adaptive as indicated by the arrow 40. This means that the difference y(k)−ê(k) is transmitted to the echo canceller so that the parameters used to represent the echo path may be updated adaptively based on the difference y(k)−ê(k). As is shown below, to calculate the estimated echo signal ê(k), the echo canceller may model the echo path linearly as in the conventional LMS data driven echo canceller or nonlinearly in accordance with the present invention.

B. Linear LMS Echo Canceller

In a linear LMS data driven echo canceller, the estimated echo signal may be modeled as $$\hat{e}(k) = H_k^T X_k = \Sigma h_{i,k} X(k - i + 1) = X_k^T H_k \quad (1)$$

where $$X_k = \begin{bmatrix} X(k) \\ X(k+1) \\ \vdots \\ X(k-n+1) \end{bmatrix} \quad (2)$$

is the transmitting data vector comprising the last n transmitted data symbols of the transmitting data signal, and $$H_k = \begin{bmatrix} h_1 \\ \vdots \\ h_n \end{bmatrix}_k \quad (3)$$

is a vector corresponding to the linear echo path impulse response as estimated by the echo canceller.

To obtain the estimated adaptive linear echo path impulse response $\hat{H}_k$, the LMS algorithm may be used by the echo canceller as follows for each iteration k:

$$\hat{H}_0 = 0 \quad (4)$$

$$\hat{H}_{k+1} = \hat{H}_k + \mu X_k (y(k) - X_k^T \hat{H}_k) \quad k < 0 \quad (5)$$

where $\mu$ is a small adaptation step size.

In short, the transmitted signal vector $X_k$ and the estimated linear echo path impulse response $\hat{H}_k$ are used to determine the estimated echo signal ê(k) in accordance with equation (1) and to determine the updated estimated linear echo path impulse response $\hat{H}_{k+1}$ in accordance with equation (5).

Figure 3:
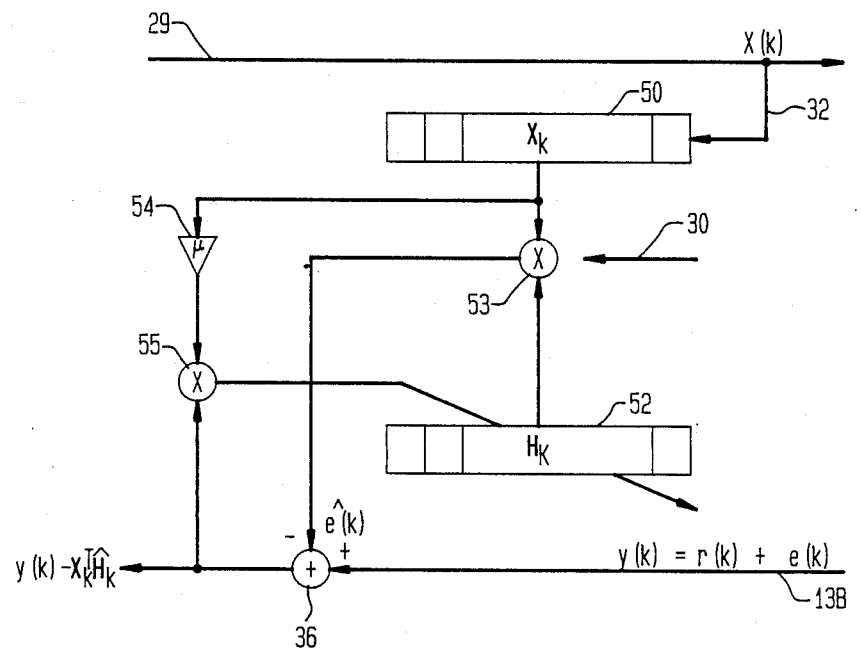
FIG. 3 schematically illustrates a conventional linear LMS data driven echo canceller.

A schematic diagram of an echo canceller 30 which carries out the above-described LMS algorithm to obtain an estimated echo ê(k) and an estimated linear echo path impulse response $\hat{H}_k$ is shown in FIG. 3. The transmitting data signal X(k) is present on line 29 and is transmitted to the echo canceller 30 via line 32 (see FIG. 2). Similarly, the combined signal y(k) which comprises the receiving data signal r(k) and the echo e(k) is present on the receiving two-wire pair 13b (see FIG. 2).

The echo canceller 30 itself comprises the shift register 50 and the non-shift register 52 both of which are of length n. The shift register 50 stores the transmitting data vector $X_k$ which as indicated above comprises the last n transmitted data symbols of the signal X(k). The non-shift register 52 stores the n values $h_{i,k}$ which make up the vector $\hat{H}_k$ characteristic of the estimated linear echo path impulse response. The value may be viewed as the adaptive filter coefficients of a digital filter forming the echo canceller.

During each iteration k, the echo canceller 30 operates as follows. The multiplier unit 53 performs the operation $X_k^T \hat{H}_k$ to obtain the estimated echo signal ê(k). This estimate echo signal is then subtracted from y(k) using the subtraction unit 36 to form the signal $y(k) - X_k^T \hat{H}_k$ which approximates r(k) and which is transmitted to the receiver 12 (see FIG. 2). During the iteration k, the transmitting data vector $X_k$ is multiplied by the step size $\mu$ using the scaler multiplier unit 54 to form the product $\mu X_k$. This product is then multiplied using the multiplier unit 55 with the signal $y(k) - X_k^T \hat{H}_k$ to form the product $\mu X_k(y(k) - X_k^T \hat{H}_k)$ which is then added to the vector $\hat{H}_k$ stored in the non-shift register 52 to form the vector $\hat{H}_{k+1}$. The vector $\hat{H}_{k+1}$ is then used to calculate the estimated echo signal in the $(k+1)^{th}$ iteration. In this manner the linear echo path impulse response is adaptively updated using the LMS algorithm.

The performance of a data driven echo canceller is characterized by its mean square error (MSE) level $\xi_k$ given by $$\xi_k = E[e(k) - \hat{e}(k)]^2 \tag{6}$$

or alternatively based on its echo return loss enhancement $$E_k = \frac{E[e(k)^2]}{E[e(k) - \hat{e}(k)]^2} \tag{7}$$

where $E[x]$ is the expected value of x. As indicated by Eq(7), the largest possible echo return loss enhancement is desired.

The MSE level decreases as the number of iterations, k, increases until a minimum MSE level is reached. The minimum MSE level is related to the length n of the echo canceller and the step size $\mu$. A large minimum MSE is expected if the length of the echo canceller is not long enough to cover the whole impulse response of the echo path. Similarly, a large step size $\mu$ causes a large minimum MSE provided the value of $\mu$ is still small enough to make the LMS adaptation algorithm stable. The step size $\mu$ also affects the convergence time, i.e. the number of iterations required to bring the MSE down to its minimum level. More convergence time and more iterations are generally required for a smaller step size $\mu$.

In a real telephone network, the average hybrid echo return loss is about 10-20 dB and the average voice channel loss is about 30 dB. Hence to have a received signal to echo ratio of 20 dB, the required echo return loss enhancement is about 30-40 dB. In practice, the maximum echo return loss enhancement for a linear LMS echo canceller is limited by phase and frequency jitter and echo path nonlinearly. In a proposed ISDN use of the local subscriber loop, the required echo return loss enhancement is about 55 dB. To achieve such a high echo return loss enhancement, the effects of nonlinearities in the echo path have to be accounted for by the echo canceller.

C. Dual Mode Nonlinear Echo Canceller

In the nonlinear echo canceller of the present invention, the nonlinear component of the echo path is represented by a nonlinear function $\psi$ which operates on each data symbol $X(k)$ such that $Y(k) = \psi(X(k)) = X(k) + f(X(k))$ where the function $f(X(k))$ is nonlinear. The linear component of the echo path is modeled in the same way as in the linear LMS echo canceller, i.e. through use of the estimated finite impulse response $$H_k = \begin{bmatrix} h_1 \\ \cdot \\ \cdot \\ \cdot \\ h_n \end{bmatrix}_k \tag{8}$$

where $h_{1,k}, h_{2,k}, \ldots, h_{n,k}$ represent the adaptive coefficients of a finite impulse response filter.

Figure 4:
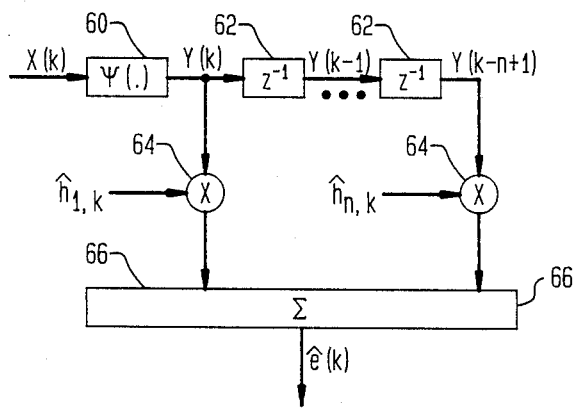
FIG. 4 schematically illustrates the signal processing operations to be carried out by the inventive nonlinear dual mode echo canceller.

The model echo path used in the nonlinear echo canceller of the present invention is illustrated in FIG. 4. As shown in FIG. 4, a symbol of the transmitting data signal $X(k)$ is first operated on by the nonlinear function $\psi$ (box 60) to form $$Y(k) = \psi(x(k)) = X(k) + f(X(k)). \tag{9}$$

A transmitting signal vector $Y_k$ is formed such that $$Y_k = \begin{bmatrix} Y(k) \\ Y(k-1) \\ \cdot \\ \cdot \\ \cdot \\ Y(k-n+1) \end{bmatrix} \tag{10}$$

i.e. $Y_k$ is formed from the n most recent values of the signal $Y(k)$ through use of the unit delay elements 62 shown in FIG. 4.

The estimated echo signal $\hat{e}(k)$ is then given by $$\hat{e}(h) = \hat{H}_k^T Y_k = \Sigma h_{i,k} Y(k.1) = Y_k^T \hat{H}_k \tag{11}$$

The products $h_{i,k}Y(k.i+1)$ are formed in FIG. 4 by the multiplier units 64 and the products are summed by the addition unit 66 to form the estimated echo signal $\hat{e}(k)$.

In accordance with the dual mode nonlinear echo canceller of the present invention, the same LMS algorithm is used to adaptively update both the nonlinear function $\psi$ and the estimated linear echo path finite impulse response $\hat{H}_k$.

The operation of the nonlinear dual mode LMS echo canceller of the present invention is divided up into two phases, a startup phase and a dual mode phase.

The operation for the startup phase is the same as that of a conventional linear LMS echo canceller. The echo canceller estimates the linear echo path finite impulse response $\hat{H}_k$ by executing the following expression based on training $X_k$'s.

$$\hat{H}_{k+1} = \hat{H}_k + \mu X_k(y(k) - X_k^T \hat{H}_k) \tag{12}$$

with the initial value $\hat{H}_o = 0$.

When $k = n_c$, the mean square error reaches a level determined by the echo path nonlinearly.

At this point, the echo canceller switches to the dual mode phase. In the dual mode phase, the echo canceller utilizes an LMS algorithm to both provide an estimate $(\hat{X}_k)_k$ of the nonlinear function $f(X_k)_k$ where $$f(X(k))_k = \begin{bmatrix} f(X(k)) \\ f(X(k-1)) \\ \cdot \\ \cdot \\ \cdot \\ f(X(k-n+1)) \end{bmatrix}_k \tag{13}$$

and to update $\hat{H}_k$.

In the dual mode phase, the echo canceller normally executes the following nonlinear function estimation operation and lets $\hat{H}_k$ remain unchanged:

$$(\hat{X}_k)_{k+1} = (\hat{X}_k)_k + \beta \hat{H}_k(y(k) - \hat{H}_k^T(X_k + (\hat{X}_k)_k) \tag{14}$$

$$_{k+1} = {_k} \tag{15}$$

$$(X_{nc}) = 0$$

The function f(.) on the right hand side of equation 14 stands for a memory fetch operation with the argument vector $X_k$ providing the addresses On the left hand side of equation 14, the function f(.) stands for a memory update operation with the argument vector $X_k$ providing the addresses. For each iteration k, there are n memory fetch and n memory update operations.

When k equals a multiple of a number M in the dual phase mode, the echo canceller updates the estimated linear echo path finite impulse response $_k$ while keeping $(X_k)_k$ constant through use of the following equations.

$$_{k+1} = {_k} + \mu(X_k + (X_k)_k)(y(k) - {_k}^T(X_k + (X_k)_k)) \tag{17}$$

$$(X_k)_{k+1} = (X_k)_k \tag{18}$$

The number M is illustratively chosen between 2 and 5.

During both modes of the dual phase mode (i.e. nonlinear function estimation and linear echo path finite impulse response estimation), the estimated echo signal is given by $$\hat{e}(h) = {_k}^T(X_k + (X_k)_k) = (x_k + (X_k)_k)^T {_k} \tag{19}$$

Figure 5:
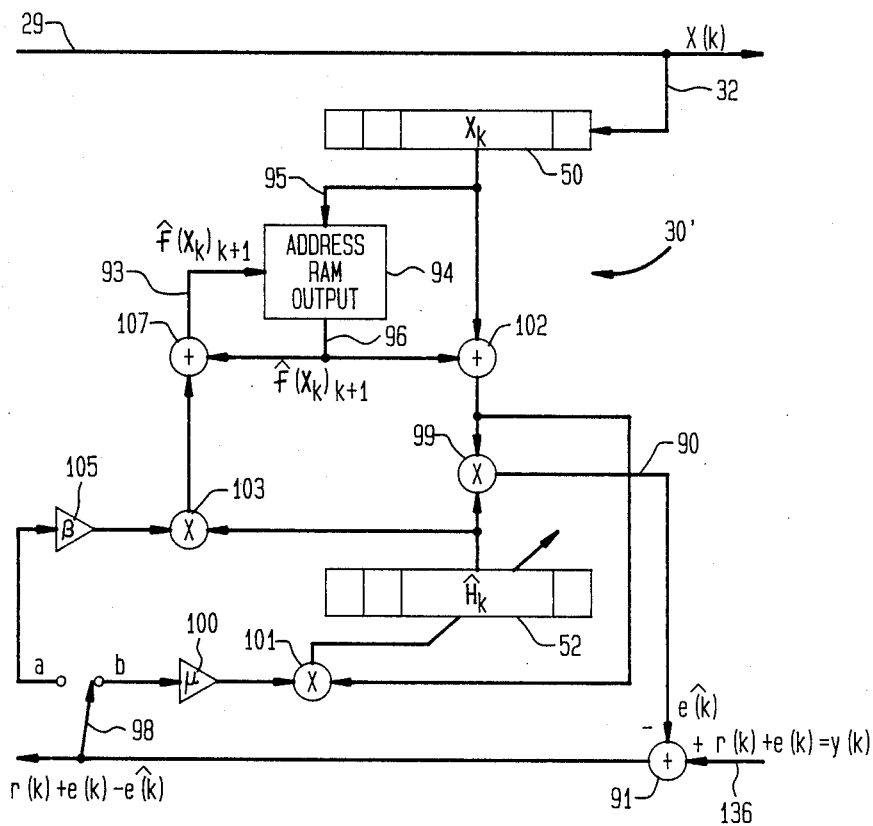
FIG. 5 schematically illustrates a nonlinear dual mode data driven echo canceller in accordance with an illustrative embodiment of the present invention.

A schematic diagram of a nonlinear dual mode echo canceller 30' in accordance with an illustrative embodiment of the invention is shown in FIG. 5. The echo canceller 30' is data driven. Thus, the echo canceller 30' receives as its input via line 32 the signal X(k). The combined signal y(k), which includes both the data signal to be received r(k) and the echo signal e(k), is present on the two-wire pair 13b. The echo canceller 30' of FIG. 5 produces as an output on line 90 an estimated echo signal ê(k). In the echo canceller 30', the estimated echo signal ê(k) takes into account the nonlinear echo path component in the manner described above. The estimated echo signal ê(k) is subtracted from y(k) through use of the subtraction unit 91 to produce a signal r(k)+e(k)−ê(k) which is the best possible approximation to r(k). This latter signal is then transmitted to the receiver 12b of the modem 12 (see FIG. 2).

The echo canceller 30' also includes the shift register 50 and non-shift register 52 both of which are of length n. The shift register 50 stores the data vector $X_k$ and the shift register 52 stores the estimated linear echo path finite impulse response $_k$.

The random access memory 94 stores the values of the vector $(X_k)_k$. In particular, values of $(X_k)_{k+1}$ are written into the random access memory 94 via line 93 using the values of $X_k$ on line 95 as addresses. Similarly values of $(X_k)_k$ are read from the memory via line 96 using the values of $X_k$ as addresses.

The echo canceller 30' further includes the switch mechanism 98 which can switch between the positions a and b shown in FIG. 5. The switch position a is used for the nonlinear function estimation task and the switch position b is used for the estimation of the linear echo path impulse response.

As indicated above, operation of the nonlinear echo canceler is divided into a startup phase and a dual mode phase. During the startup phase the nonlinear echo path as represented by the function (.) is not taken into account and the values (X(k)) may be viewed as being equal to zero. Thus, during the startup period, with the switch mechanism 98 in position b, the multiplication unit 99 utilizes training X(k)'s to form the product $X_k^T {_k}$ corresponding to the estimated echo signal ê(k). In addition, during the startup period, the signal r(k)+e(k)−ê(h) is multiplied by $\mu$ using the scaler amplifier-multiplier unit 100 and by the vector $X_k$ using the multiplier unit 101 to update the values of $_k$ (i.e. to form $_{k+1}$) in accordance with Eq (12) above. After k=$n_c$ iterations, the LMS algorithm reaches a minimum mean square error determined by the echo path nonlinearly.

When k=$n_c$, the echo canceller switches into the dual phase mode. During the dual phase mode, the switch mechanism 98 assumes the position b and the linear echo path impulse response $_k$ remains constant while the vector $(X_k)_k$ corresponding to the nonlinear part of the echo path is estimated through use of the signal processing operations represented by equation (14). More particularly, the vector quantity $X_k + (X_k)_k$ is formed by accessing the vector $(X_k)_k$ from the memory 94 and adding thereto through use of the addition unit 102 the vector $X_k$. The multiplier unit 99 then provides the product $$\hat{e}(h) = (X_k + (X_k)_k)^T {_k} \tag{20}$$

To form the vector $f(X_k)_{k+1}$, the signal r(k)+e(k)−ê(h) is formed using the subtraction unit 91 and is multiplied by the step size $\beta$ using the scaler multiplication unit 105 and by $_k$ using the multiplication unit 103. The resulting signal is then added to $(X_k)_k$ using the addition unit 107 to form $(X_k)_{k+1}$ whose values are written into the memory 94 via line 93.

Every $M^{th}$ iteration, the values $(X_k)_k$ are held constant and the values of $_k$ are updated according to Eq. (17) by switching the switch mechanism 98 into position b and using the units 102, 99, 91, 100 and 101 to form the vector $\mu(X_k + (X_k)_k)(r(k)+e(k)-\hat{e}(k))$ which is then added $_k$ to form $_{k+1}$.

D. Performance Comparison of Linear and Nonlinear Echo Canceller

FIG. 6 can be utilized to compare the performance of a conventional linear LMS echo canceller with the performance of the dual mode nonlinear echo canceller of the present invention.

In FIG. 6, the abscissa is the number of iterations and the ordinate is the mean square error in decibels. The solid curve 200 plots the mean square error of a conventional linear LMS echo canceller as a function of the number of iterations. The broken curve 300 plots the mean square error of the nonlinear dual mode echo canceller as a function of the number of iterations.

In FIG. 6, n (the length of the echo canceller filter) is 20, the adaptation step size $\mu$ for the linear echo path impulse response estimation is taken to be 0.005, the function f(X(k)) is taken to be $bX(k)^2$ where b is 0.001, the adaptation step size $\beta$ for the nonlinear function estimation is taken to be 0.5, and M is set equal to 3.

As can be seen in FIG. 6, the mean square error of the linear LMS echo canceller reaches a minimum of −60 dB after about 200 iterations. In contrast, for the nonlinear echo canceller, operation in the dual mode phase (following completion of the startup phase) enables the achievement of a mean square error below −100 dB.

In general, it should also be noted that the convergence time $\tau_{dual}$ of the inventive dual mode nonlinear echo cancellation is approximately M times longer than the convergence time $\tau_{LMS}$ of a conventional linear LMS echo canceller, i.e.

$$\tau_{dual} = M\tau_{LMS} \quad (21)$$

where as indicated above, M is typically chosen between 2 and 5.

CONCLUSION

An adaptive data driven nonlinear echo canceller is disclosed. Unlike other approaches to nonlinear echo cancellation, the inventive echo canceller models the nonlinearity of the echo path as a nonlinear function with no delay, while the linear portion of the echo path is modelled using a finite impulse response. In comparison to a conventional LMS linear echo canceller, the inventive nonlinear echo canceller utilizes only an additional small random access memory to store values of the nonlinear function used to model the nonlinear component of the echo path.

Operation of the inventive echo canceller is divided into a startup phase and a dual mode phase. During the startup phase, operation is the same as the conventional LMS linear echo canceller wherein an LMS algorithm is used to iteratively estimate the linear echo path impulse response. When the remaining uncancelled echo reaches a limit determined by the echo path nonlinearity, operation switches to the dual mode phase. In the dual mode phase, the LMS algorithm is used to estimate both the nonlinear function characteristic of the nonlinear echo path and the finite impulse response characteristic of the linear echo path. During the dual mode phase, the nonlinear echo canceller normally estimates the nonlinear function while the finite impulse response is held constant. Periodically, the nonlinear function is held constant and the estimated finite impulse response is updated.

Finally, the above-described embodiments of the invention are intended to be illustrative. Numerous alternative embodiments may be devised without departing from the spirit and scope of the following claims.

We claim:

1. An echo canceller for cancelling an echo signal comprising
   means operative during a training period and using a least mean square algorithm to estimate a finite impulse response of a linear component of an echo path, and
   means operative during a subsequent dual mode phase and using a least mean square algorithm for estimating both a nonlinear function representative of a nonlinear component of said echo path and said finite impulse response of said linear component of said echo path,
   wherein said means operative during said dual mode phase alternately estimates said nonlinear function and said finite impulse response.

2. The echo canceller of claim 1 wherein said means operative during said dual mode phase includes a random access memory for storing values of said nonlinear function.

3. An echo canceller for generating an estimated echo signal ê(k) to cancel an echo signal e(k) generated by a transmission channel from a data signal X(k), where k is a time index, said echo canceller comprising
   memory means for storing a vector $(X_k)_k$ where $\psi(.)$ is a nonlinear function representative of a nonlinear component of an echo transmission path of said echo signal and $X_k$ is a vector formed from the values of the signal X(k) for the last n values of the time index k where n is an integer,
   means for obtaining a vector $_k$ corresponding to an estimated finite impulse response of a linear component of said echo transmission path, and
   means for obtaining the product of $(X_k + (X_k)_k)$ and $_k$ to form said estimated echo signal ê(k).

4. The echo canceller of claim 3 wherein said echo canceller includes means for iteratively estimating said vector $(X_k)_k$ and for iteratively estimating said finite impulse response.

5. The echo canceller of claim 4 wherein said estimating means utilize a least means square algorithm to estimate both said vector $(X_k)_k$ and said finite impulse response.

6. A method for cancelling an echo in a telecommunications channel used to transmit a digital data signal, said method comprising the steps of
   during a training period, using a least mean square algorithm to estimate the finite impulse response of a linear component of an echo path, and
   during a subsequent dual mode phase, using a least mean square algorithm to both estimate a nonlinear function representative of a nonlinear component of said echo path and said finite impulse response of said linear component of said echo path,
   wherein during said dual mode phase, alternately, said nonlinear function is estimated and said finite impulse response is held constant and said finite impulse response is estimated and said nonlinear function is held constant.

7. The method of claim 6 wherein during said dual mode phase, said finite impulse response is estimated during every $m^{th}$ iteration of said least mean square algorithm, where M is a number between 2 and 5.

8. A method for cancelling an echo in a telecommunications channel used to transmit a digital data signal, said method comprising the steps of
   during a training period, using a least mean square algorithm to estimate the finite impulse response of a linear component of an echo path, and
   during a subsequent dual mode phase, using a least mean square algorithm to both estimate a nonlinear function representative of a nonlinear component of said echo path and said finite impulse response of said linear component of said echo path,
   wherein said method further comprises the step of storing values of said nonlinear function in a random access memory.

9. The method of claim 10 wherein said nonlinear function representative of said nonlinear component of said echo path includes no delay.

10. A method for generating an estimated echo signal ê(k) for use in an echo canceller to cancel an echo signal e(k) where k is a time index comprising the steps of storing a nonlinear data vector $Y_k = \psi(X_k)$, where $X_k$ is a data vector formed from the values of said signal X(k) being transmitted for the last n values of the index k where n is an integer and where $\psi$ is a nonlinear function representing the effect of a nonlinear component of a transmission path of said echo signal e(k), and forming the product of $Y_k$ $_k$ where $_k$ is an estimate of a finite impulse response of a linear component of said echo path to obtain said estimated echo signal ê(k).

11. The method of claim 10 wherein said nonlinear data vector $Y_k$ and said finite impulse response $_k$ are estimated iteratively using a least mean square algorithm.

12. The method of claim 11 wherein alternatively, said finite impulse response is held constant and said nonlinear vector $Y_k$ is estimated and said nonlinear vector $Y_k$ is held constant and said finite impulse response $_k$ is estimated.

13. An echo canceller comprising
  means for storing values of a nonlinear function representative of a nonlinear component of an echo path,
  means for storing values representative of a finite impulse response of a linear component of said echo path, and
  means for executing a least mean square algorithm for alternately estimating said values of said nonlinear function and said values representative of said finite impulse response.

14. A method for cancelling an echo in a communications channel comprising
  storing values of a nonlinear function representative of a nonlinear component of an echo path,
  storing values representative of a finite impulse response of a linear component of an echo path, and
  executing a least mean square algorithm for alternately estimating said values of said nonlinear function and said values representative of said finite impulse response.

* * * * *